W. HAIGH.
PACKAGE.
APPLICATION FILED AUG. 3, 1914.
1,153,221.
Patented Sept. 14, 1915.
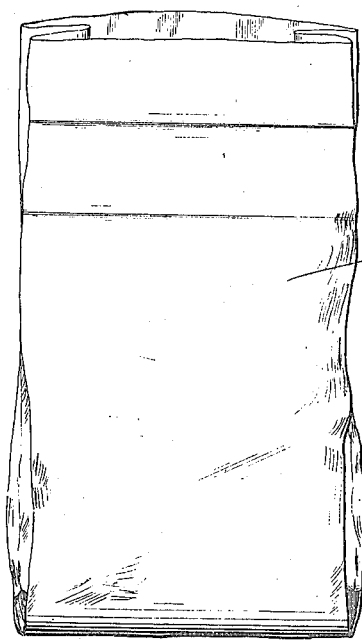
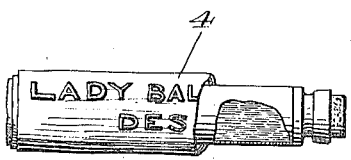
Fig. 4.
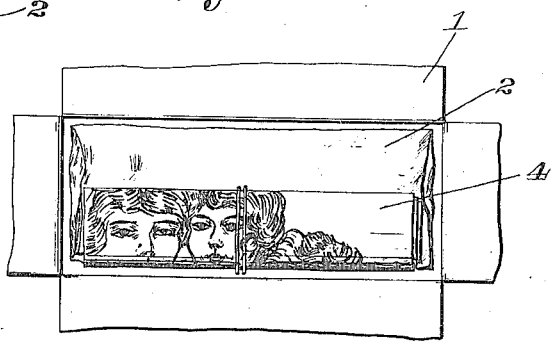
Fig. 3.
Fig. 5.
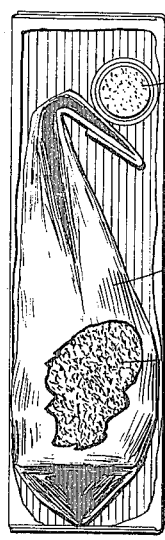
Fig. 2.
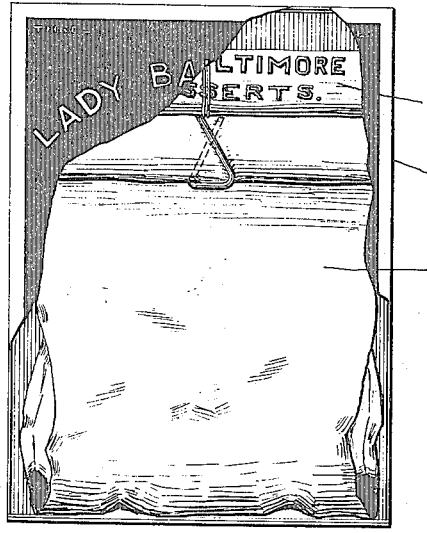
Fig. 1.
Witnesses
Porter H. F. Vault
A. G. Donegan
Inventor
William Haigh
by
Stuart Stuart
Attorney

UNITED STATES PATENT OFFICE.

WILLIAM HAIGH, OF BALTIMORE, MARYLAND.

PACKAGE.

1,153,221.  Specification of Letters Patent.  Patented Sept. 14, 1915.

Application filed August 3, 1914.  Serial No. 854,668.

*To all whom it may concern:*

Be it known that I, WILLIAM HAIGH, a citizen of the United States of America, residing in the city of Baltimore, State of Maryland, have invented certain new and useful Improvements in Packages, of which the following is a specification.

Prepared foods, particularly desserts, mixed in the requisite proportions "ready to cook", are offered to the trade in various forms. These commonly consist of a farinaceous or gelatinous substance dried to reduce the weight and volume to the last degree and ground or shredded so as to be easily soluble. In manufacturing the desserts thus presented to the trade however, the attempt is made to offer the product in a condition in which it requires merely the addition of liquid, either hot or cold, to place it in an edible condition; in other words, the flavoring is incorporated in the farinaceous or gelatinous material before it is dried and ground to form the finished product. It is found that prepared foods made in this way are not satisfactory, first, because the pleasant flavors and odors of the various fruits and berries which are embodied in the best flavoring extracts, are due to volatile substances which are either destroyed or driven off in drying; second, because the same substances in so far as they are not driven off in drying, deteriorate to such a degree when kept in the porous containers in which such prepared foods are put up, that their presence cannot be detected when the product finally reaches the table; and a third disadvantage is due to the fact that these various prepared or partly prepared foods are necessarily boiled or at least heated for a considerable period in the final treatment by the consumer prior to serving, and if the flavoring has not previously evaporated and escaped, it is sure to be destroyed or lost at this time.

To avoid these various difficulties and produce a prepared material which can be offered to the trade in such a way that it is available to produce a palatable and delicately flavored dessert with the minimum of difficulty in preparation, is the subject of my invention.

To this end I combine in a single package, a quantity of dried and ground farinaceous and gelatinous material and sugar sufficient in quantity for a single making, with a quantity of flavoring extract to combine with the body or principal material, but to prevent evaporation of the extract and deterioration from the various causes outlined, instead of incorporating it in this material, I inclose it in a separate container so that the package as presented consists of a paper or similar box marked with the various inscriptions incident to such packages, and containing a sack, preferably of paper or similar material, inclosing the dried farinaceous or gelatinous powder to compose the body material of the pudding or similar dessert, together with a small vial of flavoring, the body material being sufficient in quantity for a single making and the flavoring extract being sufficient to combine with the body material.

A package of the kind referred to constructed in accordance with my invention in its preferred form, is illustrated in the accompanying drawing.

Figure 1 is a front elevation of the package, a portion of the wall of the box being broken away to disclose the contents; Fig. 2 is a side elevation of the same, a portion being likewise broken away, and a portion of the sack being removed to show the material contained therein; Fig. 3 is a top plan of the box opened to disclose the vial wrapper and the sack; Fig. 4 shows the vial and wrapper with the latter partly removed, the vial being also broken away to disclose the liquid; and Fig. 5 is an elevation showing the sack.

Referring to the drawing by numerals, each of which is used to indicate the same or similar parts in the different figures, the device consists of a paper box or similar container 1, in which is inclosed a paper or similar sack 2 containing sufficient powdered or comminuted material 3 for a single mixing, and a vial 4 containing sufficient flavoring extract to combine with the dry material.

In the preferred form of the invention, the powdered material consists of combined gelatinous and farinaceous substances, dehydrated to a high degree and unflavored, and the flavoring extract is of the highest quality and efficiency as it contains all of the volatile products necessary to give the natural flavor of the fruit. As there is sufficient liquid present to take up this extract with its volatile properties when thus added, and as the dessert is not heated after the extract is added, the flavoring thus applied remains in the finished dessert without depreciation or loss of any of its properties.

To use the material in the package, the contents of the bag is mixed with a little cold liquid, forming a paste, then boiling liquid is added and the mixture is boiled for a short time, as one or two minutes. After this the contents of the vial is added and stirred in, and the mixture is cooled.

It will thus be apparent that the flavoring is not heated for any considerable period and that the volatile constituents, as soon as they are exposed, are taken up by an excess of liquid so that they are never boiled or otherwise exposed for evaporation.

Having thus described my invention, what I claim and desire to secure by Letters Patent is:

A dessert package consisting of a box, a sack containing comminuted, gelatinous and farinaceous material, the sack being inserted in the box, the upper portion of the sack being empty and folded down to form a suitable closure; a bottle of liquid flavoring; suitable wrapping for the bottle, the latter being placed in the package so that it rests on the folded portion of the paper bag which forms a convenient support for the bottle.

Signed at Baltimore, Maryland, this 31st day of July 1914.

WILLIAM HAIGH.

Witnesses:
ZELLA KUHN,
EDWIN F. SAMUELS.